Dec. 13, 1927.
G. R. McDONALD
1,652,904
AUTOMATIC CONTROL EQUIPMENT
Original Filed Nov. 29, 1922
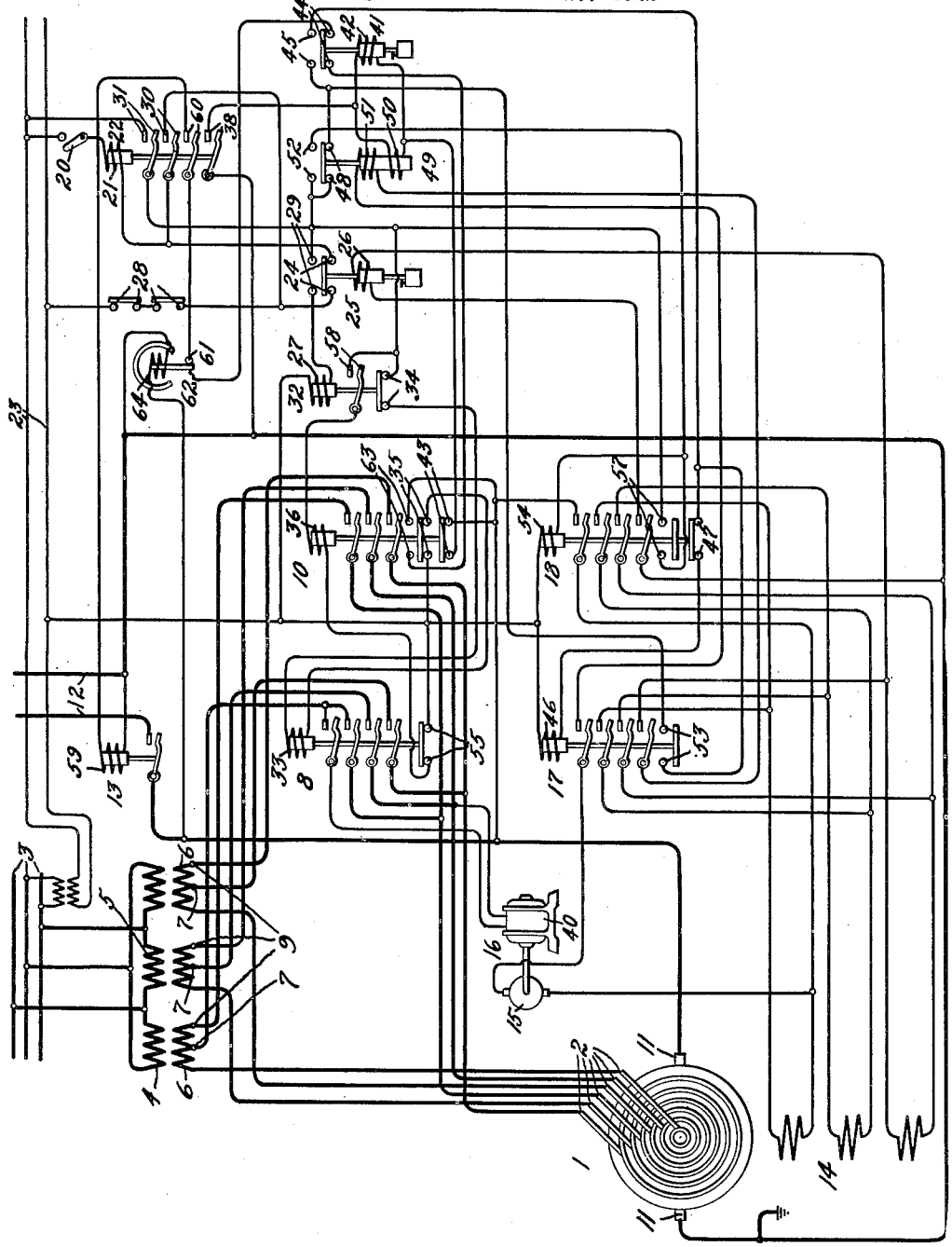
Inventor:
Gordon R. McDonald,
by *Alexander S. [signature]*
His Attorney.

Patented Dec. 13, 1927.

1,652,904

UNITED STATES PATENT OFFICE.

GORDON R. McDONALD, OF SCHENECTADY, NEW YORK, ASSIGNOR TO GENERAL ELECTRIC COMPANY, A CORPORATION OF NEW YORK.

AUTOMATIC CONTROL EQUIPMENT.

Application filed November 29, 1922, Serial No. 604,079. Renewed September 24, 1926.

My invention relates to automatic control equipments for dynamo-electric machines and more particularly to automatic control equipments for synchronous converters.

One object of my invention is to provide a simple and improved control equipment of the type above referred to in which a plurality of electromagnetically actuated devices are interconnected and operated automatically in the proper sequence under all conditions to control the operation of a synchronous converter.

Another object of my invention is to provide in an automatic control equipment of the type referred to an improved arrangement for preventing the equipment from operating to effect the restarting of the converter in an improper manner.

Another object of my invention is to provide in an automatic control equipment of the type referred to an improved arrangement for insuring that the direct current voltage of the converter is of the right polarity before the field winding of the converter is self-excited and full alternating current voltage is impressed upon the converter.

My invention will be better understood from the following description taken in connection with the accompanying drawing, and its scope will be pointed out in the appended claims.

The accompanying drawing shows diagrammatically the apparatus and circuit connections employed in an automatic control equipment for a synchronous converter in which my invention is embodied.

Referring to the drawing, 1 represents a synchronous converter, the alternating current terminals 2 of which are arranged to be connected to any suitable source of alternating current such as the supply circuit 3. The transformer 4 is interposed between the supply circuit 3 and the alternating current terminals 2 of the synchronous converter. The primary winding 5 of the transformer is connected to the supply circuit 3 and the secondary winding 6 is provided with the low voltage taps 7, which are arranged to be connected to the terminals 2 by means of the contactor 8, and with the high voltage taps 9, which are arranged to be connected to the terminals 2 by means of the contactor 10. Any other suitable switching means, however, may be used for impressing a low and a high voltage upon the terminals 2 of the synchronous converter.

The direct current terminals 11 of the synchronous converter are arranged to be connected to a direct current load circuit 12 by any suitable switching means such as a contactor 13.

The synchronous converter is also provided with a field winding 14 which is arranged to be connected to any suitable source of direct current, such as the generator 15 of a motor generator 16, by means of a contactor 17. The field winding 14 is also arranged to be connected across the direct current terminals 11 of the synchronous converter by means of the contactor 18. The field winding 14 is arranged to be separated into sections when both of the contactors 17 and 18 are open, so that a high voltage is not induced in the field winding when the converter is being started.

In order to start and stop the synchronous converter under normal conditions a hand switch 20 is provided which, when closed, effects the starting of the converter and which, when opened, effects the stopping of the converter. It is to be understood, however, that any other well known means, which may be either automatically or manually operated, may be used to control the starting and stopping of the converter. As shown in the drawing the closing of the switch 20 connects the coil 21 of the master relay 22 across the control circuit 23 which may be supplied with current from any suitable source, such as one phase of the supply circuit 3. The energizing circuit of the coil 21 also includes the contacts 24 of a relay 25, the coil 26 of which is arranged to be connected so as to be responsive to the current through the field winding 14 when the contactor 18 is closed and the field winding 14 is connected across the direct current terminals 11 of the converter. Therefore, it is apparent that the converter can be started only when the contacts 24 of the relay 25 are closed. In the circuit of the coil 21 there are also connected the contacts 28 of the protective devices which are usually provided with automatic substation control equipments, so that the coil 21 cannot be energized unless all of the apparatus is in an operative condition. In order to simplify the drawing all of these protective devices have been omitted since they do not constitute a part of the present invention. Contacts 28, however, are shown in the circuit of the coil 21 to indicate where the contacts of these protective devices may be connected.

The relay 25 is so designed that it does not open its contacts 24 and close its contacts 29 until the shunt field current builds up to a predetermined steady value after the contactor 18 closes in a manner hereinafter described. The opening of the contacts 24, however, does not deenergize the coil 21 because the contacts 30 of the master relay 22, which are closed when the coil 21 is energized, complete a shunt circuit around the contacts 24. The closing of the contacts 29 when the relay 25 is energized connects the coil 27 of a relay 32 across the control circuit 23. The energization of the coil 27 effects the opening of the contactor 8 and the closing of the contactor 10 in a manner hereinafter described.

The closing of contacts 31 of the master relay 22 when the coil 21 is energized connects the coil 33 of the contactor 8 across the supply circuit 23 so that the terminals 2 are connected to the low voltage taps 7 of the transformer 4. The circuit of the coil 33 also includes the contacts 34 of the relay 32 which are closed when the coil 27 is not energized, and the auxiliary contacts 35 on the contactor 10 which are closed when the coil 36 of the contactor 10 is not energized. It is therefore evident that the contactor 8 can be closed to connect the alternating current terminals 2 of the converter to the low voltage taps 7 of the transformer 4 only when the contactor 10 is open and the shunt field current is less than a predetermined value. Therefore it is evident that if the shunt field current fails after the converter is started the circuit of the starting contactor 8 is reestablished.

The energization of the coil 33 of the contactor 8 also connects the single phase motor 40 of the motor generator set 16 to the low voltage taps 7 of the transformer 4 so that the direct current generator 15 is available to supply current to the field winding 14 when the contactor 17 closes to pull the converter into step with the right polarity after the converter has reached a predetermined speed.

As soon as the contactor 8 closes the synchronous converter starts to rotate and when it has reached a predetermined speed, determined by the voltage relay 41, the coil 42 of which is connected across the terminals 11 of the converter by means of the auxiliary contacts 43 on the contactor 10 and contacts 38 of the master relay 22 the coil 46 of the contactor 17 is energized to connect the field winding 14 across the terminals of the generator 15. Preferably relay 41 is so designed that it only responds to an alternating current of a very low frequency or to direct current. Therefore with such a construction the relay 41 does not operate to open its contacts 44 and close its contacts 45 until after the slip frequency has decreased below a predetermined value or the synchronous converter has reached synchronous speed. The relay 41 is preferably of the type known in the art as a hesitating control relay and particularly of the type which is inductively damped so that it has a considerable "hesitating" characteristic. That is to say, when the coil 42 is deenergized, the relay does not open its contacts 44 until some time later.

The closing of the contacts 45 connects the coil 46 of the contactor 17 across the control circuit 23. This circuit of the coil 46 includes the contacts 31 of the master relay 22, the contacts 48 of a relay 49 and auxiliary contacts 47 of the contactor 18 which are closed when the contactor 18 is open. Therefore, the contactor 17 can be closed only when the contactor 18 is open, the relay 49 is in its normal position and relay 41 is in its operated position indicating that the converter is connected to the lower voltage starting taps of the transformer and that its speed is above a predetermined value.

The relay 49 is provided with two coils 50 and 51. The coil 50 is connected in multiple with the coil 42 of relay 41, across the terminals 11 of the converter and the coil 51 is connected in the circuit between the generator 15 and the field winding 14. The coils 50 and 51 are arranged so that the energization of either one of them alone does not operate the relay so that it opens its contacts 48 and closes its contacts 52, but after the relay has been operated, the energization of the coil 50 alone is sufficient to maintain the relay in its energized position so that the contacts 52 remain closed. When both of the coils are energized so that the magnetomotive forces set up by them are in the same direction, the relay 49 operates to open its contacts 48 and close its contacts 52. With the connections shown in the drawing the relay 49 operates to open its contacts 48 and close its contacts 52 only when the direct current voltage of the converter builds up to a predetermined value in a predetermined direction with respect to the voltage of the generator 15, and the current supplied to the field winding by the generator builds up to a predetermined steady value. If the direct current voltage of the synchronous converter builds up in the wrong direction when the converter is started and before the contactor 17 is closed, the converter slips a pole and the direct current voltage reverses when the field winding 14 is connected to the generator 15 and as soon as the direct current voltage builds up in the right direction and the field current builds up to a predetermined steady value, the relay 49 operates to open the contacts 48 and close its contacts 52. If the voltage of the synchronous converter builds up in the right direction, when the converter is started, the relay 49 operates just as soon as the field current builds up to a predetermined steady value after the coil 46 of the contactor 17 is energized.

In order to insure that the contactor 17 does not open while the voltage of the converter is being reversed in case it builds up in the wrong direction when the converter is started, the contactor is provided with the auxiliary contacts 53 which are closed when the contactor is closed and which complete a shunt circuit around the contacts 45 of the voltage relay 42.

The opening of the contacts 48 of the relay 49 when the polarity of the converter is correct with respect to the polarity of the generator 15, opens the circuit of the coil 46 of the contactor 17 so that the field winding 14 is disconnected from the generator 15. The relay 49, however, maintains its contacts 52 closed because the coil 51 is still energized. The closing of the contacts 52 of the relay 49 connects the coil 54 of the contactor 18 across the control circuit 23. The circuit of the coil 54 also includes the contacts 31 of the master relay 22. As soon as the coil 54 of the contactor 18 is energized, the field winding 14 is connected across the direct current terminals 11 of the synchronous converter so that the converter is now self-excited. The contactor 18 is provided with the auxiliary contacts 57 which are closed when the coil 54 of the contactor 18 is energized so as to complete a shunt circuit around the contacts 52 in order that the coil 54 may remain energized after the relay 49 opens its contacts 52. The opening of the auxiliary contacts 47 when the coil 54 is energized prevents the coil 46 of the contactor 17 from being closed when the coil 54 is energized.

As soon as the shunt field current builds up to a predetermined steady value, the relay 25, the coil 26 of which is connected in series with the field winding 14, opens its contacts 24 and closes its contacts 29. The opening of the contacts 24 does not deenergize the coil 21 of the master relay 22 because the contacts 30, which complete a shunt circuit around the contacts 24, have been previously closed. The closing of the contacts 29 of the relay 25 completes the circuit of coil 27 of the relay 32 across the control circuit so that it opens its contacts 34 and closes its contacts 58. The opening of the contacts 34 deenergizes the coil 33 of the contactor 8 so that the terminals 2 of the synchronous converter are disconnected from the low voltage taps 7 of the transformer 4. The opening of the contactor 8 also disconnects the motor 40 of the motor generator set 16 from the low voltage taps 7 so that the motor generator set 16 shuts down. The closing of the auxiliary contacts 55 of the contactor 8 connects the coil 36 of the contactor 10 across the control circuit 23. The circuit of the coil 36 also includes the contacts 58 of the relay 32 and the contacts 31 of the master relay 22. The closing of the contactor 10 connects the terminals 2 of the synchronous converter to the high voltage taps 9 of the transformer 4.

It is well known that when a synchronous machine is started in the manner above described, the change in the connections of the converter from the low taps of the transformer to the high voltage taps causes a transient disturbance in the field current. It has been found that the field current may be reversed for an instant under these conditions. In order to prevent the relay 25 from dropping out under these conditions it is preferable to have the relay of the hesitating type and particularly of the inductively damped type so that the relay has a time delay in dropping out and therefore will maintain its contacts closed through a transient disturbance of the kind above described.

The energization of the coil 36 of the contactor 10 also opens the auxiliary contacts 35 in the circuit of the coil 33 so that the contactor 8 cannot be closed while the contactor 10 is closed. The auxiliary contacts 43 are also opened when the coil 36 is energized so that the coils 42 and 50 of the relays 41 and 49 respectively are deenergized. Since the relay 41 is of the hesitating control type it does not close its contacts 44 until a predetermined time after its winding 42 is deenergized thereby introducing a certain time interval which is desirable between connections of the converter to the high voltage taps 9 and the connection of the converter to the distribution circuit 12. The contacts 44 of the relay 41 are connected in the circuit of the coil 59 of the contactor 13, which controls the connection between the direct current terminals 11 of the converter and the direct current load circuit 12. The circuit of the coil 59 which is connected across the terminals 11 of the converter, also includes the contacts 60 of the master relay 31, the contacts 61 of a polarized relay 62 and the auxiliary contacts 63 on the contactor 10 which are closed when the coil 36 is energized. The polarized relay 62 is provided with a winding 64 which is connected across the terminals 11 of the converter. This relay is so designed that it closes its contacts only when the direct current voltage of the converter is a predetermined value and in a predetermined direction. It is evident, therefore, that the direct current terminals 11 can be connected to the load circuit 12 only when the master relay 22 is energized, full voltage is impressed upon the alternating current terminals 2 of the converter, and the direct current voltage of the converter is above a predetermined value and in the right direction.

Any suitable means may be provided for protecting the synchronous converter against short circuits and overloads upon the direct current load circuit 12. No such means are shown in the drawing, however, because they are well known in the art and do not constitute a part of my invention.

The operation of the equipment shown in the drawing is as follows:

When the converter is shut down and the apparatus is in an operative condition the control devices are in the positions shown. In order to start the converter under normal conditions the hand switch 20 is closed, which completes the circuit of the coil 21 of the master relay 22. The closing of the contacts 31 of the master relay 22 completes the circuit of the coil 33 of the contactor 8. The closing of the contactor 8 connects the motor 40 of the motor generator set to the low voltage terminals of the transformer, and also connects the terminals 2 of the converter to the low voltage terminals. As soon as the converter has reached a certain speed, the voltage relay 41 operates to complete the circuit of the coil 46 of the contactor 17, which connects the field winding 14 of the converter to the direct current generator 15. The closing of the auxiliary contacts 53 completes a locking circuit for the coil 46 which is independent of the contacts 45. As soon as the polarity of the converter is correct with respect to the polarity of the generator 15 and the field current has built up to a predetermined steady value, the relay 49 operates and opens the circuit of the coil 46 of the contactor 17 and closes the circuit of the coil 54 of the contactor 18, so that the field winding of the converter is connected across the direct current terminals of the converter. The closing of the auxiliary contacts 57 completes a locking circuit for the coil 54 which is independent of the contacts 52. As soon as the shunt field current builds up to a predetermined value, the relay 26 operates to energize the relay 32. The energization of the relay 32 opens the circuit of the coil 33 of the contactor 8, so that the motor generator set 16 shuts down and the converter is disconnected from the low voltage taps 7 of the transformer. As soon as the contactor 8 opens so that its contacts 35 are closed the coil 36 of the contactor 10 is energized and connects the terminals 2 of the converter to the high voltage taps of the transformer. The energization of the coil 36 also opens the circuits of the coils 42 and 50 of the relays 41 and 49 respectively so that these relays are deenergized and are restored to their normal positions. As soon as the contacts 44 of the relay 41 are closed, the circuit of the coil 59 of the contactor 13 is completed if the polarity of the converter is correct and the direct current voltage exceeds a predetermined value. The converter is now connected to the direct current load circuit and continues to supply current thereto until either the switch 20 is opened or an abnormal condition occurs, which opens one of the contacts 28 in the circuit of the coil 21 of the master relay 22. The opening of either the hand switch 20 or one of the contacts 28 deenergizes the coil 21 of the master relay 22 so that the contacts 30, 31, 38 and 60 are opened. The opening of the contacts 31 of the master relay 22 deenergizes the coil 27 of the relay 32 and the coil 54 of the contactor 18. The deenergization of the relay 32 opens the circuit of the coil 36 of the contactor 10 so that the converter is disconnected from the high voltage taps 9 of the transformer. The deenergization of the contactor 18 disconnects the field winding 14 from the direct current terminals 11 so that the relay 25 is deenergized. After a predetermined time the relay 25 closes its contacts 24 so that the master relay can again be energized.

The opening of the contacts 60 of the master relay 22 opens the circuit of the coil 59 of the contactor 13 so that the load circuit 12 is disconnected from the direct current terminals 11 of the converter.

The synchronous converter is now entirely disconnected from the supply circuit 3 and the load circuit 12. In case, however, the abnormal condition, which causes the converter to shut down is of a momentary character, the shutting down operation is the same as above described except that as soon as the relay 25 closes its contacts 24, the master relay 22 is again energized and the heretofore described starting operation is repeated. The hesitating characteristic of the relay 25 is such that it does not close its contacts 24 until after all of the other control devices have been restored to their normal positions.

If the shunt field current fails for any reason after the converter is started, the relay 25 becomes deenergized so that the relay 32 is deenergized which in turn effects the deenergization of the coil 36 so that the contactor 10 opens, thereby disconnecting the converter from the running taps 9 of the transformer. The opening of the auxiliary contacts 63 on the contactor 10 deenergizes the coil 59 of the contactor 13 so that the direct current distribution circuit is disconnected from the direct current brushes of the converter. As soon as the contactor 10 closes its auxiliary contacts 35, the coil 33 of the contactor 8 is energized so that the converter is again connected to the starting taps 7 of the transformer and the motor generator set 16 is started. The closing of the auxiliary contacts 43 of the contactor 10 completes the circuits of the coils 42 and 50 of the relays 41 and 49. The relay 41 effects the operation of the contactor 17 and the relay 49 effects the operation of the contactor 18 in the same manner as when the converter is started under normal conditions. If the failure of shunt field current was due to the field circuit being broken, the closing of the contactor 18 does not effect the energization of the field relay 25. Therefore, the converter remains connected to lower voltage taps 7 of the transformer until one of the protective devices, with which the equipment is provided, operates to shut down the converter.

Furthermore it is evident that if one of the phases of the supply circuit 3 is reversed when the converter is being started, the starting operation is the same as the normal starting operation above described until the field winding 14 is connected to the generator by the contactor 17. Since the reversal of one phase of a polyphase supply circuit reverses the direction of rotation of the polyphase machines to which it supplies current, it is evident that the converter rotates in the wrong direction when it is started. Since, however, the generator 15 is driven by a single phase motor 40 the motor rotates in its normal direction so that the polarity of the generator 15 is normal. Therefore the polarity of the converter after contactor 17 is closed, is made wrong by the current supplied to the field winding of the generator 15 since the converter is rotating in the wrong direction. Therefore relay 49 never picks up and equipment remains at this point in its sequence of operation until one of the protective devices operates to shut the converter down.

While I have shown and described only one embodiment of my invention I do not desire to be limited to the exact arrangement shown and described but seek to cover in the appended claims all those modifications that fall within the true spirit and scope of my invention.

What I claim as new and desire to secure by Letters Patent of the United States, is:—

1. In combination, a source of alternating current, a synchronous converter, means whereby said converter may be connected to said source, a source of direct current, means whereby said source of direct current may be connected to the field winding of said converter, and a relay for effecting the connection of the field winding of said converter to the direct current brushes of said converter comprising two windings, one of said windings being connected across the direct current brushes of said converter and the other of said windings being connected in series with said source of direct current and the field winding of said converter.

2. In combination, a source of alternating current, a synchronous converter, switching means whereby said converter may be connected to said source so that a low voltage may be impressed upon said converter, switching means whereby said converter may be connected to said source so that a high voltage may be impressed upon said converter, a source of direct current, means whereby said source of direct current may be connected to the field winding of said converter, a relay responsive to the relative directions of the voltage of said source of direct current and the voltage across the direct current brushes of said converter for effecting the connection of the field winding of said converter to the direct current brushes of said converter, and means responsive to the shunt field current for effecting operation of said second mentioned switching means.

3. In combination, a source of alternating current, a synchronous converter, switching means whereby said converter may be connected to said source so that a low voltage may be impressed upon said converter, switching means whereby said converter may be connected to said source so that a high voltage may be impressed upon said converter, a source of direct current, means whereby said source of direct current may be connected to the field winding of said converter, a relay having a winding connected in series with said source of direct current and the field winding of said converter and a second winding connected across the direct current brushes of said converter for controlling the connection of the field winding of said converter to the direct current brushes of the converter, and means operative in response to the current supplied to said field winding from the direct current brushes to effect the operation of said second mentioned switching means.

4. In combination, a source of alternating current, a synchronous converter, switching means whereby said converter may be connected to said source so that a low voltage may be impressed on said converter, a second switching means whereby said converter may be connected to said source so that a high voltage may be impressed on said converter, an electromagnet arranged when energized to effect the operation of said first mentioned switching means, an energizing circuit for said electromagnet, contacts in said energizing circuit, means whereby the field winding of said converter may be connected to the direct current brushes of said converter, means responsive to the shunt field current for controlling the operation of said second mentioned switching means, and the contacts in said energizing circuit.

5. In combination, a source of alternating current, a synchronous converter, switching means whereby said converter may be connected to said source so that a low voltage may be impressed on said converter, a second switching means whereby said converter may be connected to said source so that a high voltage may be impressed on said converter, an electromagnet arranged when energized to effect the operation of said first mentioned switching means, an energizing circuit for said electromagnet, means whereby the field winding of said converter may be connected to the direct current brushes of said converter, a hesitating control relay connected in the shunt field circuit of said converter and arranged to effect the operation of said second mentioned switching means when the shunt field current builds up to a predetermined steady value, and contacts in said energizing circuit controlled by said relay whereby said electromagnet can only operate to effect the operation of said first mentioned switching means when said relay is deenergized.

6. In combination, a source of alternating current, a synchronous converter, switching means whereby said converter may be connected to said source so that a low voltage may be impressed on said converter, a second switching means whereby said converter may be connected to said source so that a high voltage may be impressed on said converter, an electromagnet arranged when energized to effect the operation of said first mentioned switching means, an energizing circuit for said electromagnet, means whereby the field winding of said converter may be connected to the direct current brushes of said converter, a hesitating control relay connected in the shunt field circuit of said converter and arranged to effect the operation of said second mentioned switching means when the shunt field current builds up to a predetermined steady value, contacts in said energizing circuit controlled by said relay whereby said electromagnet can only operate to effect the operation of said first mentioned switching means when said relay is deenergized, and contacts connected in multiple with the contacts controlled by said relay and arranged to be operated by said electromagnet when it is energized.

7. In combination, a source of alternating current, a synchronous converter, switching means whereby said converter may be connected to said source so that a low voltage may be impressed on said converter, a second switching means whereby said converter may be connected to said source so that a high voltage may be impressed on said converter, an electromagnet arranged when energized to effect the operation of said first mentioned switching means, an energizing circuit for said electro-magnet, a source of direct current, means controlled by the voltage across the direct current brushes of said converter for effecting the connection of the field winding of said converter to said source of direct current, means controlled by the voltage of said converter for effecting the connection of the field winding to the direct current brushes of the converter so that the converter is self-excited, means responsive to the shunt field current for effecting the operation of said second mentioned switching means and the deenergization of both of said voltage controlled means, and contacts in said energizing circuit controlled by said shunt field current responsive means.

8. In combination, a source of alternating current, a synchronous converter, switching means whereby said converter may be connected to said source so that a low voltage may be impressed on said converter, a second switching means whereby said converter may be connected to said source so that a high voltage may be impressed on said converter, an electromagnet arranged when energized to effect the operation of said first mentioned switching means, an energizing circuit for said electromagnet, a source of direct current, means controlled by the voltage across the direct current brushes of said converter for effecting the connection of the field winding of said converter to said source of direct current, means controlled by the current supplied to the field winding by said source of direct current and by the voltage of said converter for effecting the connection of the field winding to the direct current brushes of the converter so that the converter is self-excited, a hesitating control relay responsive to the shunt field current for effecting the operation of said second mentioned switching means and the deenergization of both of said voltage controlled means, contacts in said energizing circuit controlled by said relay, and contacts connected in multiple with the contacts controlled by said relay and arranged to be closed by said electromagnet when it is energized.

9. In combination, a source of alternating current, a synchronous converter, switching means whereby said converter may be connected to said source so that a low voltage may be impressed upon said converter, switching means whereby said converter may be connected to said source so that a high voltage may be impressed upon said converter, a source of direct current, means arranged to effect the operation of said first mentioned switching means, a hesitating control relay connected across the direct current brushes of said converter and arranged to effect the connection of said source of direct current to the field winding of said converter when the slip is less than a predetermined value, means whereby the field winding of said converter is self-excited, said second mentioned switching means is operated and said relay is deenergized after the polarity of said converter is correct, a direct current load circuit, means whereby the direct current brushes of said converter may be connected to said load circuit, a circuit for said last mentioned means, and contacts in said last-mentioned circuit controlled by said relay whereby said last-mentioned circuit is completed only when said relay is in its deenergized position.

10. In combination, a source of alternating current, a synchronous converter, switching means whereby said converter may be connected to said source so that a low voltage may be impressed upon said converter, switching means whereby said converter may be connected to said source so that a high voltage may be impressed upon said converter, a source of direct current, means arranged to effect the operation of said first mentioned switching means, a hesitating control relay connected across the direct current brushes of said converter and arranged to effect the connection of said source of direct current to the field winding of said converter when the slip of said converter is less than a predetermined value, means controlled by the current supplied to the field winding of said converter by said source of direct current for effecting the connection of the field winding of said converter to the direct current brushes of the converter, means controlled by the shunt field current for controlling the operation of said second mentioned switching means and the deenergization of said relay, a direct current load circuit, means whereby the direct current brushes of said converter may be connected to said load circuit, a circuit for said last mentioned means, and contacts in said last-mentioned circuit controlled by said relay whereby said last-mentioned circuit is completed only when said relay is in its deenergized position.

11. In combination, a source of alternating current, a synchronous converter, switching means whereby said converter may be connected to said source so that a low voltage may be impressed upon said converter, switching means whereby said converter may be connected to said source so that a high voltage may be impressed upon said converter, a source of direct current, means arranged to effect the operation of said first mentioned switching means, a hesitating control relay connected across the direct current brushes of said converter and arranged to effect the connection of said source of direct current to the field winding of said converter when the slip of said converter is less than a predetermined value, means controlled by the current supplied to the field winding of said converter by said source of direct current for effecting the connection of the field winding of said converter to the direct current brushes of the converter, means controlled by the shunt field current for effecting the operation of said second mentioned switching means, contacts in the circuit of said relay controlled by said second mentioned switching means whereby said relay is deenergized when said second mentioned switching means is operated, a direct current load circuit, means whereby the direct current brushes of said converter may be connected to said load circuit, a circuit for said last mentioned means, and contacts in said last mentioned circuit controlled by said relay whereby said last-mentioned circuit is completed only when said relay is in its deenergized position.

12. In combination, a source of polyphase current, a polyphase synchronous converter, a direct current generator, a single phase motor for driving said generator, means whereby said converter may be connected to said source and said motor may be connected to one of the phases of said source, means whereby said generator may be connected to the field winding of said converter, and means responsive to a predetermined relation between the polarities of said converter and said generator for connecting the field winding of said converter to the direct current brushes of the converter.

13. In combination, a source of polyphase current, a polyphase synchronous converter, a direct current generator, a single phase motor for driving said generator, means whereby said converter may be connected to said source and said motor may be connected to one of the phases of said source, means connected and arranged whereby its operation depends upon the speed of said converter for connecting the field winding of said converter to said generator, and a relay for effecting the connection of the field winding of said converter to the direct current brushes of said converter, comprising two windings, one of said windings being connected across the direct current brushes of said converter and the other of said windings being connected in series with said generator and the field winding of said converter.

14. In combination, a source of polyphase current, a polyphase synchronous converter, a direct current generator, a single phase motor for driving said generator, switching means whereby said converter may be connected to said source so that a low polyphase voltage may be impressed on said converter and whereby said motor may be supplied with current from one phase of said source, a second switching means whereby said converter may be connected to said source so that a high voltage may be impressed on said converter, means whereby the operation of said first mentioned switching means may be effected to start said converter and said motor, means connected and arranged so that its operation depends upon the slip frequency of said converter for connecting the field winding of said converter to said generator, means responsive to a predetermined relation between the polarities of said converter and said generator for connecting the field winding of said converter to the direct current brushes of the converter, and means whereby said first mentioned switching means is operated to disconnect said converter and said motor from said source and said second mentioned means is operated to connect said converter to said source so that a high voltage is impressed on said converter after said polarity responsive means is operated.

15. In combination, a source of alternating current, a synchronous converter having a shunt field winding, automatic switching means for controlling the connection of said converter to said source whereby a relatively low alternating current voltage is first impressed upon said converter to effect the starting thereof and a relatively high alternating current voltage is subsequently impressed thereon, means for effecting the disconnection of said converter from said source, and a relay in the shunt field circuit of said converter for controlling the reconnection of said converter to said source after it has been disconnected therefrom.

16. In combination, a source of alternating current, a synchronous converter having a shunt field winding, means for applying starting and normal operating voltages to said converter, means for effecting the disconnection of said converter from said source, and means comprising a relay in the circuit of the shunt field winding of said converter for controlling the reapplication of starting voltage to said converter after it has been disconnected from said source.

17. In combination, a source of alternating current, a synchronous converter having a shunt field winding, means for applying starting and normal operating voltages to said converter, means for effecting the disconnection of said converter from said source, and means comprising a time relay in the circuit of the shunt field winding of said converter for preventing the reapplication of the starting voltage to said converter for a predetermined time after the converter is disconnected from said source.

18. In combination, a source of alternating current, a synchronous converter having a shunt field winding, means for applying starting and normal operating voltages to said converter, means for effecting the disconnection of said converter from said source, means for opening the circuit of said shunt field winding when said converter is disconnected from said source, and a time relay in the circuit of the shunt field winding arranged to prevent the reapplication of the starting voltage to said converter for a predetermined time after said shunt field winding becomes deenergized.

19. In combination, a source of alternating current, a synchronous converter, automatic switching means arranged to effect the connection of said converter to said source so that a relatively low voltage is impressed upon said converter to start it and to effect the connection of said converter to said source so that a relatively high voltage is impressed upon said converter after it has reached synchronous speed and has a predetermined polarity, a relay arranged to be connected across the direct current brushes of said converter during the starting operation thereof to control the operation of said automatic switching means, means for disconnecting said relay from the direct current brushes of said converter, a load circuit, electroresponsive means for connecting said load circuit to said converter, a circuit for said electroresponsive means, and contacts in said last mentioned circuit controlled by said relay so that said electroresponsive means is operative to connect said load circuit to said converter only when said relay is in its deenergized position.

20. In combination, a source of alternating current, a synchronous converter, automatic switching means arranged to effect the connection of said converter to said source so that a relatively low voltage is impressed upon said converter to start it and to effect the connection of said converter to said source so that a relatively high voltage is impressed upon said converter after it has reached synchronous speed and has a predetermined polarity, a relay arranged to be connected across the direct current brushes of said converter during the starting operation thereof to control the operation of said automatic switching means, means responsive to the connection of said converter to said source so that a relatively high voltage is impressed thereon for effecting the disconnection of said relay from the direct current brushes of said converter, a load circuit, a circuit breaker for connecting said load circuit to said converter, a control circuit for said circuit breaker, and contacts in said control circuit controlled by said relay whereby said last mentioned circuit is completed only when said relay is in its deenergized position.

In witness whereof I have hereunto set my hand this 27th day of November, 1922.

GORDON R. McDONALD.